US011998501B2

(12) United States Patent
Truckai et al.

(10) Patent No.: US 11,998,501 B2
(45) **Date of Patent: *Jun. 4, 2024**

(54) SYSTEMS FOR PROMOTING SEXUAL WELL-BEING IN MALES

(71) Applicant: Kemeny Healthcare Inc., San Jose, CA (US)

(72) Inventors: Csaba Truckai, Saratoga, CA (US); John H. Shadduck, Menlo Park, CA (US); Akos Toth, Cupertino, CA (US)

(73) Assignee: Kemeny Healthcare Inc., San Jose, CA (US)

(*) Notice: Subject to any disclaimer, the term of this patent is extended or adjusted under 35 U.S.C. 154(b) by 437 days.

This patent is subject to a terminal disclaimer.

(21) Appl. No.: 16/930,789

(22) Filed: Jul. 16, 2020

(65) Prior Publication Data

US 2021/0015700 A1 Jan. 21, 2021

Related U.S. Application Data

(60) Provisional application No. 62/875,508, filed on Jul. 18, 2019.

(51) Int. Cl.

*A61H 19/00* (2006.01)
*A61H 9/00* (2006.01)
*A61H 23/02* (2006.01)

(52) U.S. Cl.

CPC ........... *A61H 19/32* (2013.01); *A61H 9/0057* (2013.01); *A61H 23/0245* (2013.01); *A61H 2201/0103* (2013.01); *A61H 2201/0192* (2013.01); *A61H 2201/1207* (2013.01)

(58) Field of Classification Search

CPC ............ A61H 2230/30; A61H 2230/06; A61H 23/00; A61H 23/008; A61H 19/00; A61H 19/30; A61H 19/32; A61F 2005/412

USPC ............................................................ 600/38

See application file for complete search history.

(56) References Cited

U.S. PATENT DOCUMENTS

| | | | | |
|---|---|---|---|---|
| 10,441,498 | B1 * | 10/2019 | Zhu | A61H 23/02 |
| 2007/0239074 | A1 * | 10/2007 | Ein-Gal | A61B 17/2251 601/2 |
| 2018/0296383 | A1 * | 10/2018 | Blanche | A61H 19/44 |

* cited by examiner

*Primary Examiner* — Samuel G Gilbert
(74) *Attorney, Agent, or Firm* — Levine Bagade Han LLP

(57) ABSTRACT

Systems for promoting sexual well-being in males and for treating erectile dysfunction using acoustic energy.

22 Claims, 10 Drawing Sheets

SYSTEMS FOR PROMOTING SEXUAL WELL-BEING IN MALES

RELATED APPLICATION

This application is a non-provisional of U.S. Provisional Application No. 62/875,508 filed Jul. 18, 2019, the entirety of which is incorporated by reference.

FIELD OF THE INVENTION

The present invention relates to systems for promoting sexual well-being in males and in some cases for treating erectile dysfunction and, more particularly, to such systems that may be utilized by consumers, general practitioners, and/or erectile dysfunction specialists.

BACKGROUND OF THE INVENTION

High intensity acoustic waves are known in the art for imparting mechanical forces to soft tissues in patients for treating acute and chronic conditions. The delivery of such acoustic energy, or shock waves, can stimulate tissue regeneration and repair processes in soft tissues and bone. Shock waves are characterized by instant changes in pressure when delivered to soft tissue, together with high amplitude and non-periodicity. Such shock waves can be created by various mechanisms such as electromagnets, compressed air, or electrical energy adapted to create vacuum bubbles in fluids.

Several mechanisms of action have been described for high intensity acoustic waves in soft tissue and bone. In one aspect, acoustic waves can initiate and maintain tissue repair processes in aging or damaged tissues resulting from enhanced expression of growth factors such as the VEGF, PCNS, BMP etc. following delivery of such acoustic energy. As a result of these processes, blood vessels may be stimulated to grow which in turn can improve blood supply and oxygenation of the treated tissue. In another aspect, shockwaves may cause the dissolution of calcified fibroblasts in some tissues. Acoustic waves may break up such existing calcifications which then can be removed by the lymphatic system. In another aspect, acoustic waves can treat plaque in blood vessels to improve blood flow in a patient's vasculature.

SUMMARY OF THE INVENTION

The present disclosure includes methods, devices, and systems for treating tissue to promote sexual well-being in males. In particular, the methods, devices, and systems can be used by consumers, general practitioners, and/or erectile dysfunction specialists.

In one example, a device under the present disclosure treats tissue through the use of acoustic energy can optionally apply a vacuum to the tissue. One such variation of a tissue treatment device includes an elongate tubular assembly extending along an axis a proximal opening adjacent to an interior chamber adapted for receiving a shaft of a mammalian penis; and a plurality of acoustic energy emitters comprising at least a first acoustic energy emitter and a second acoustic energy emitter, the plurality of acoustic energy emitters configured to produce acoustic energy, where the first acoustic energy emitter and the second acoustic energy emitter are positioned adjacent to sides of the interior chamber to deliver the acoustic energy to sides of the shaft when placed within the interior chamber.

In one variation, the first acoustic energy emitter and the second acoustic energy emitter are positioned on opposing sides of the interior chamber. In additional variations, the emitters can be positioned on a single side such that the tubular assembly is rotated during use. Variations of any of the devices described herein include an interior chamber with at least one wall portion that is configured to be adjusted between a first cross-sectional shape that does not engage the shaft a second cross-sectional shape that engages the shaft. The wall portions can include any number of contact portions that are configured to engage the shaft. These contact portions can be configured transmit acoustic energy to the shaft more efficiently than a remainder of the wall. In one variation, the contact portion includes a surface portion that can be elongated. In additional variations, the contact portion includes an elastomeric surface portion. The contact portion can also include a material that is suited to efficiently transfer the acoustic energy to the tissue rather than absorb the energy. For example, such a material can comprise a high density material or other suitable material. Therefore, variations of the contact portion can include multiple materials, such as a material to provide elastomeric properties and materials that allow efficient transfer of the acoustic energy/shock waves without absorbing the energy. The contact portions can be configured such that the acoustic energy emitters transmit acoustic energy through contact portions.

In another variation of the device, the treatment device can further include a negative pressure source coupled to the interior chamber adapted for adjusting the tubular member between the first and second cross-sectional shapes.

The devices described herein can be coupled to a controller that is configured for modulating parameters of acoustic energy delivery. For example, the parameters can be selected from the group of amplitude, frequency, duty cycle and sequencing among the plurality of emitters. The devices can also be coupled to a negative pressure source that produces suction/vacuum in the interior chamber.

One example of an acoustic emitter includes an electromagnetic device. Alternatively, or in combination, the acoustic emitters in a device can comprises an electromagnetic device, a compressed air device and/or a cavitation device.

Additional variations of the devices include an elastomeric structure within the elongate tubular assembly and surrounding the interior chamber, where at least one of the plurality of acoustic energy emitters is positioned in the elastomer structure.

In another variation, the treatment can further comprise a fluid-filled chamber position radially outward from the at least one acoustic energy emitter such that inflation of the fluid-filled chamber causes the at least one acoustic energy emitter to contact the mammalian penis. The fluid-filled chamber can contain a magnetorheologic fluid or any other type of fluid.

The devices described herein can include a controller configured for modulating parameters of acoustic energy delivery. For example, such parameters can be selected from the group of amplitude and frequency.

In an additional variation of a tissue treatment device, the device can include a wall surrounding an interior chamber, where the wall includes a first wall portion and a second wall portion, wherein the first wall portion includes a non-deflectable material and the second wall portion includes a deflectable material, where the second wall portion also includes at least one non-elastomeric section adapted for transmission of acoustic energy therethrough.

Another variation includes a wall adjacent to the interior chamber, the wall comprising an elastomeric portion having at least one contact element, where the contact element is configured to transmit acoustic energy to a greater degree than the elastomeric portion, where the at least one contact element is adjacent to at least one of the plurality of acoustic energy emitter.

The present disclosure also includes a method for treatment of tissue. For example, such a method can include positioning a mammalian penile shaft in an interior chamber of an elongate tubular assembly; and delivering acoustic energy to the shaft from one or more acoustic energy emitters disposed on adjacent to sides of the interior chamber.

In one variation, the method can include delivering acoustic waves along a first transmission axis and a second transmission axis. In another variation, the method includes creating a negative pressure environment in the interior chamber. The application of negative pressure can cause at least one acoustic energy emitter to contact the shaft. In an additional variation, creating the negative pressure environment in the interior chamber comprises creating at least first and second levels of negative pressure in the interior chamber; and delivering acoustic energy to the shaft at each of the at least first and second levels.

BRIEF DESCRIPTIONS OF THE DRAWINGS

The present invention will be more fully appreciated and understood from the following detailed description of the present invention when viewed in conjunction with the accompanying figures, in which.

DETAILED DESCRIPTION OF THE INVENTION

The following detailed description describes currently contemplated modes of carrying out the invention. The description is not limiting but is made for the purpose of illustrating the general principles of the invention.

Figure 1:
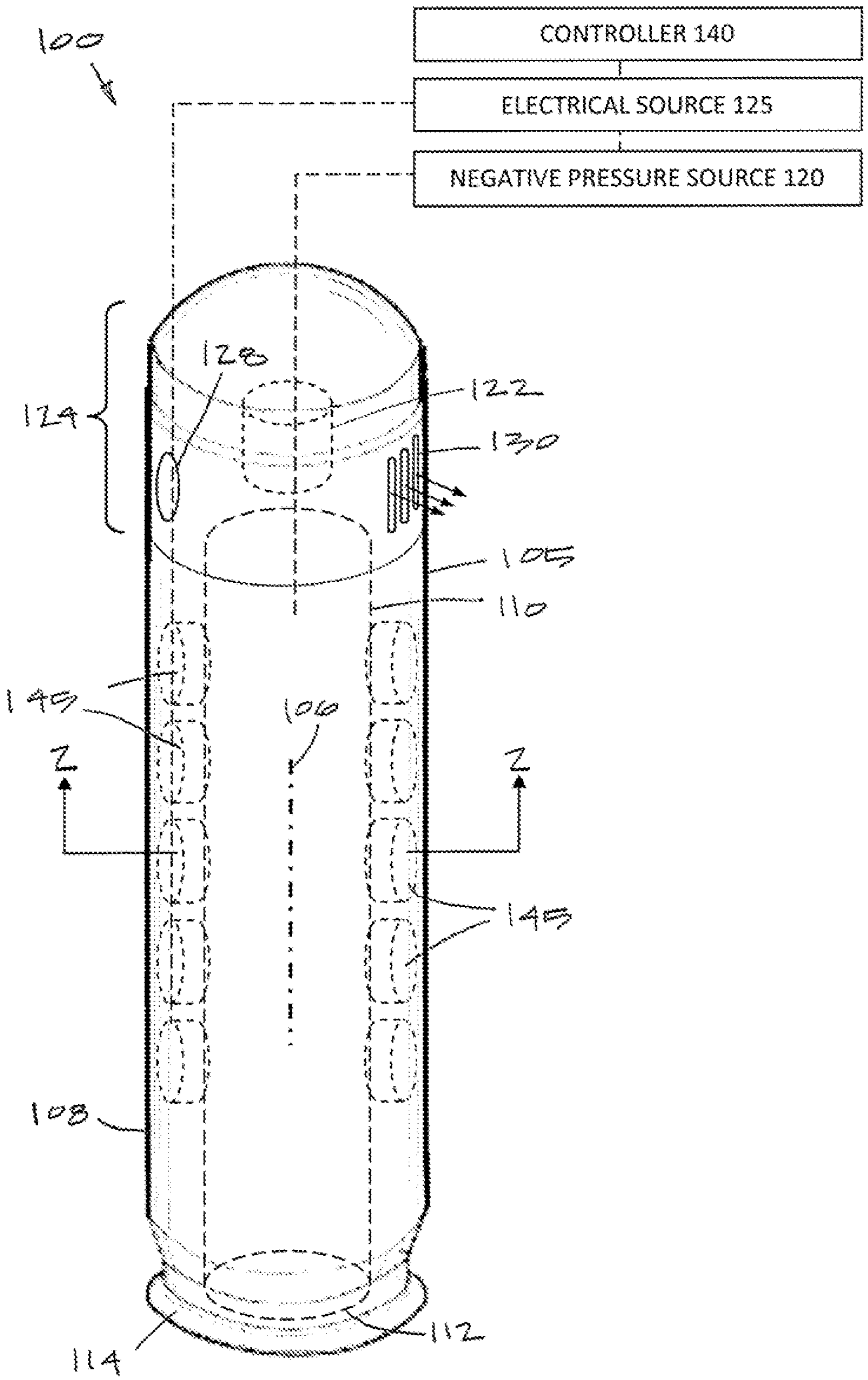
FIG. 1 is a perspective view of an acoustic device adapted for treatment of a mammalian penile shaft, in accordance with the present invention.
Figure 2:
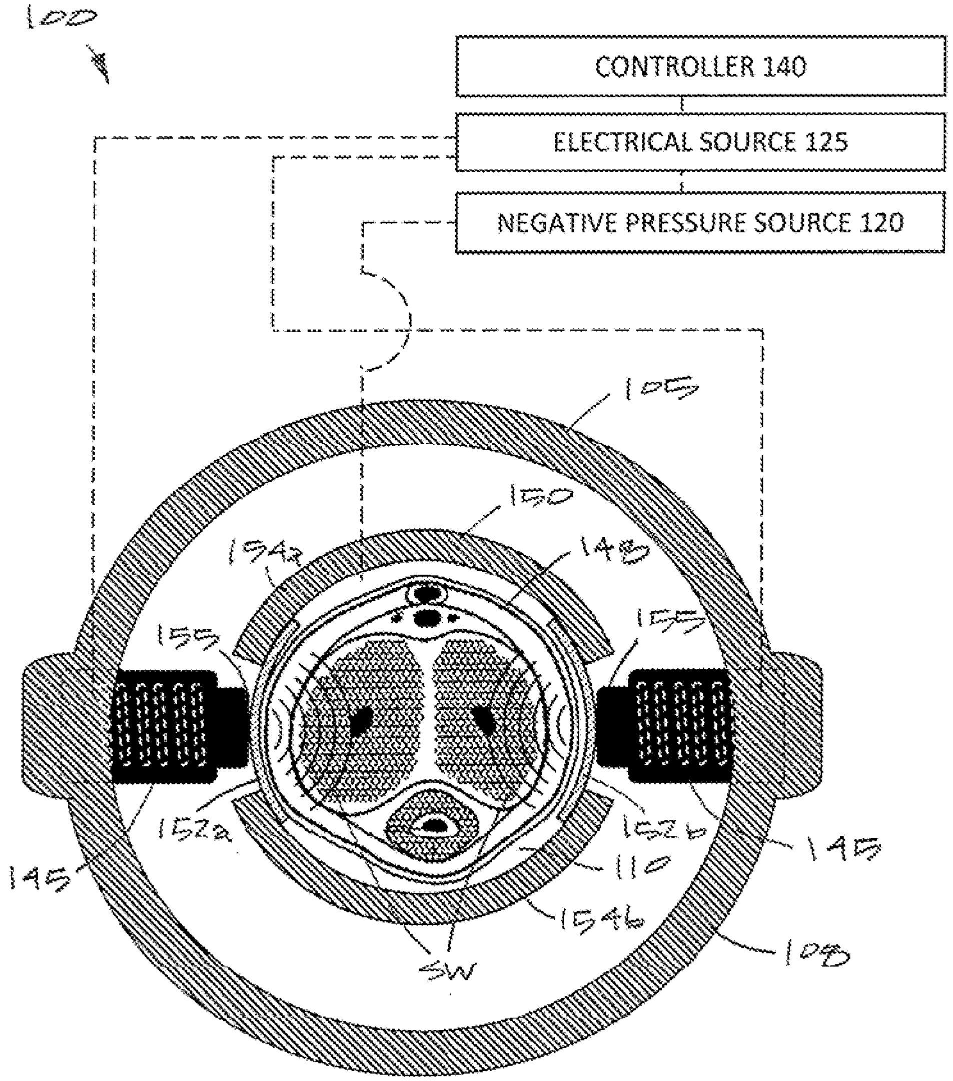
FIG. 2 is a cross-sectional diagrammatical view of the acoustic device of FIG. 1 taken along line 2-2 of FIG. 1.

FIGS. 1 and 2 illustrate an acoustic treatment system 100 comprising an elongate member 105 extending about longitudinal axis 106 with a substantially rigid wall 108 surrounding an interior chamber 110 therein. The interior chamber 110 has an open proximal end 112 which is dimensioned to receive and accommodate a mammalian flaccid or erect penile shaft of a patient. A sponge-like cuff 114 may be disposed around the open proximal end 112 of the interior chamber.

In this variation, a negative pressure source 120 is provided to evacuating air from the interior chamber 110. A pump 122 is shown disposed in a distal portion 124 of the elongated member 105 but it should be appreciated that the negative pressure source 120 can be remote and coupled to the device through tubing. The negative pressure source 120, together with an electrical source 125 described further below are controlled by a controller 140.

In operation, the negative pressure source can be actuated by an actuator switch 128 which would then operate the pump 122 to evacuate air from the interior chamber 110 through vents 130 in the distal portion 124 as shown in FIG. 1. The controller 140 can be connected to a pressure sensor in the distal portion 124 to modulate the negative pressure source to maintain a selected negative pressure or to turn off the pump 122 when the selected negative pressure is achieved. The pump 122 can be connected to a battery carried in the distal portion 124 or can be connected by cable to a remote electrical energy source. As is known in the art, the negative pressure can increase blood flow to the patient's organ when disposed in the device.

Referring to FIG. 1, a plurality of acoustic energy emitters 145 are shown schematically and are adapted to deliver energy in the form of acoustic waves, or shockwaves, to a patient's penile shaft 148 disposed in the interior chamber 110. The number of emitters 145 can vary from 1 to 10 or more and are generally disposed in opposing sides of the tubular member 105. In one variation, the acoustic emitters 145 are electromagnetic devices and are coupled to the electrical energy source 125, which may be a battery carried in the distal portion 124 or a remote electrical source.

Now turning to FIG. 2, a cross-sectional view of the system of FIG. 1 is shown with a penile shaft 148 disposed in the interior chamber 110. In this variation, the interior chamber 110 is surrounded by a sleeve 150 that includes thin elastomeric elements 152*a* and 152*b* bonded on opposing sides of the sleeve 150 about open areas 151. The sleeve 150 can be rigidly coupled to the wall 108 of the outer tubular member 105 or the inner sleeve 150 can have first and second flexibly coupled sides 154*a* and 154*b* that provide an adjustable diameter interior chamber 110 by stretching and relaxing the elastomeric elements 152*a* and 152*b*. In this variation, the sleeve sides 154*a* and 154*b* can be flexibly coupled to the outer wall 108, for example with living hinge mechanisms. In any event, the acoustic emitters 145 in this variation are fixed to the outer wall 108 of the tubular member 105 and have a transmitting element 155 that is adapted to contact the elastomeric elements 152*a* and 152*b* that in turn engage the penile shaft 148 as can be seen in FIG. 2.

Referring to FIG. 2, the acoustic emitters 145 are disposed substantially opposed to one another by 180° so that energy delivery will be simultaneous to the tissue in the shaft 148 which can prevent tissue recoil as could occur if acoustic energy was applied from only one side. Acoustic waves or shockwaves SW are shown schematically in FIG. 2. Other mechanisms (not shown) can be provided to adjust and maintain the acoustic emitters 145 in a fixed or rigid coupling to the outer wall 108 but still allow for radial movement of the emitters inwardly and outwardly to engage a particular diameter of a penile shaft 148.

The controller 140 is adapted to control the amplitude, frequency, sequencing, duty cycle and duration of a treatment provided by the plurality of acoustic emitters 145. For example, energy delivery can be simultaneously delivered from all acoustic emitters 145 or a sequence of energy delivery from emitters 145 can be provided along the axis 106 of the device. In another variation, the controller 140 can modulate the negative pressure within the interior chamber 110 during any sequence of energy delivery from the acoustic emitters 145. In general, the acoustic energy delivered will be in the range of 25 mJ to 500 mJ per delivery or energy impulse at a rate ranging between 1 and 200 Hz. Typically, such acoustic energy will be delivered in the range of 50 mJ to 250 mJ per impulse at a rate ranging between 1 and 50 Hz.

In another variation, the device can include only two acoustic emitters 145 which are on opposing sides of a translatable member (not shown) which is adapted for movement in the proximal and distal directions, and optionally rotationally, relative to outer wall 108 about longitudinal axis 106 to treat various axial portions of the patient's penile shaft 148. The movement of such a translatable member can be motor driven and controlled by the controller 140 or can be moved manually by the physician or operator of the device, which may be the patient.

When any system described above is used by the physician or patient, the controller 140 can be adapted for adjustment by a touchscreen coupled by cables to the device 100. Alternatively, a cell phone or other remote computer using Bluetooth can communicate with the controller 140 to adjust and operate the system.

Figure 3:
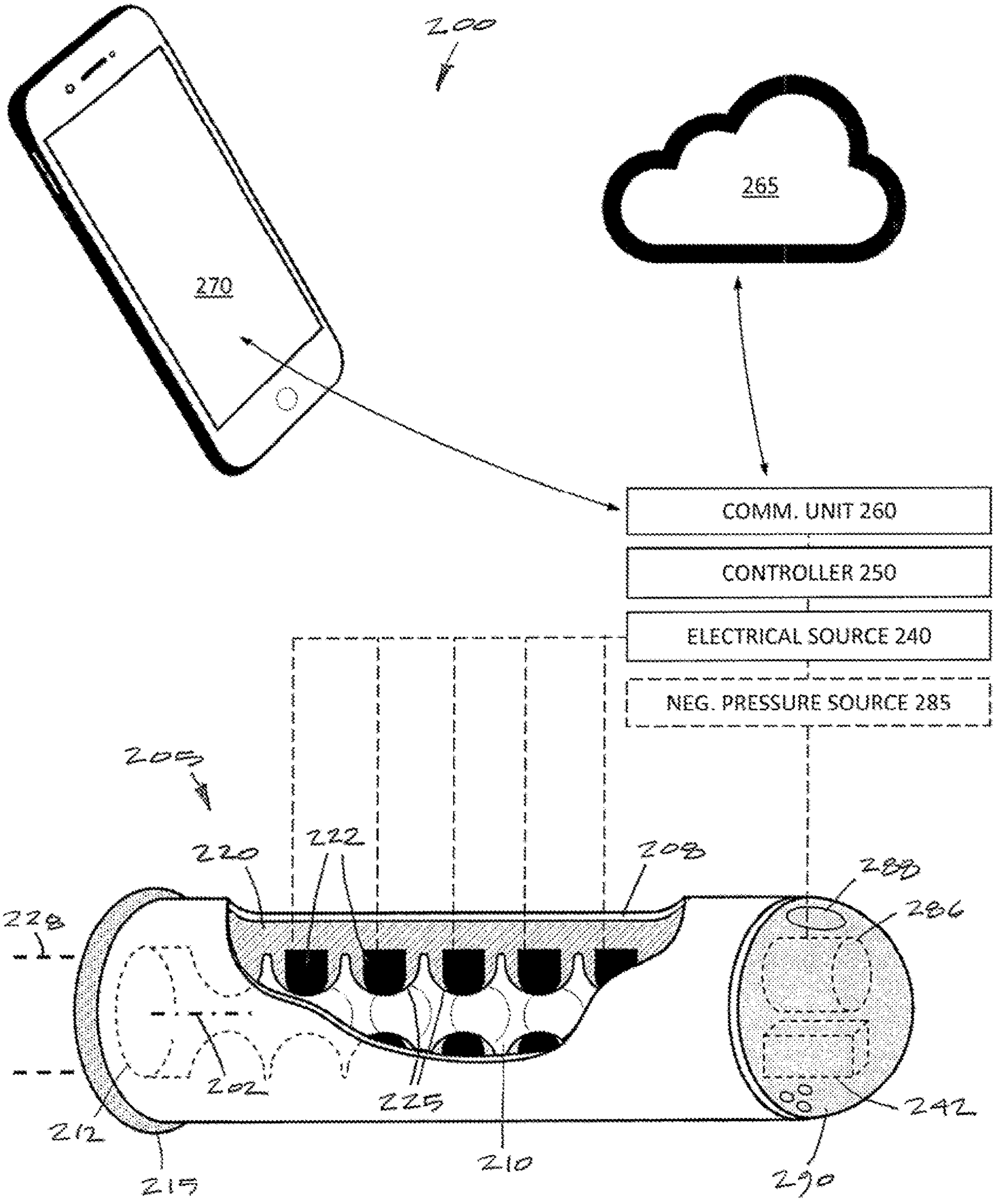
FIG. 3 is a cut-away schematic view of a variation of an acoustic treatment device.

FIG. 3 illustrates an alternative acoustic wave or shockwave treatment system 200 that differs from the previous embodiment in certain aspects, particularly, in providing the negative pressure source as an optional component. As can be seen in FIG. 3, the system includes an elongate assembly 205 extending about longitudinal axis 206 where the assembly has a substantially rigid, thin outer wall 208 and defines an interior chamber 210 therein. The interior chamber 210 has an opening 212 in the proximal end 214 thereof that is again dimensioned to receive and accommodate a mammalian penile shaft of a patient. A foam cuff 215 or soft cuff of similar material may be disposed around the opening 212 of the interior chamber 210.

In this variation, the structure 220 surrounding the interior chamber 210 comprises a thick layer of a soft elastomer, such as silicone, which carries a plurality of acoustic emitters 222. In one variation, each of the emitters 222 is disposed in a protruding element or projection 225 which is adapted for flexing proximally and distally as a penile shaft 228 (phantom view) is introduced into the interior chamber 210. In another variation, the acoustic emitters 222 can be carried in an entirely cylindrical wall of the soft elastomer structure 220, but it is believed that a plurality of protruding elements 225 will facilitate the insertion and withdrawal of penile shaft 228.

Still referring to FIG. 3, in this variation, the acoustic emitters 222 can number from 1 to 60 or more and be disposed in a generally opposing arrangement with the emitters opposing one another by 180°. Additionally, the emitters can be radially spaced apart around axis 202 by 180°, 90° or any other suitable amount depending on the dimensions of the acoustic emitters 222. In other words, there may be a series of sets of 1 to 6 or more acoustic emitters 222 in a radial arrangement in projecting elements 225 disposed in 360° around axis 202 of the interior chamber 210. In this variation, it can be understood that the system 200 is adapted for use with an erect penile shaft 228 and thus is contemplated for use as a maintenance therapy for patients not suffering from severe erectile dysfunction, whereas the previous embodiment anticipated using negative pressure to draw blood into the penile shaft to create an erect penile shaft.

In FIG. 3, it can be understood that each of the acoustic emitters 222 is electromagnetically operated and is coupled to an electrical source 240 which may be a battery pack 242 (including suitable capacitors for energy storage for firing the emitters) carried in the device or the emitters 222 may be coupled to a remote power source. The controller 250 again is provided to modulate all operating parameters of the acoustic emitters 222, such as acoustic wave amplitude, frequency, sequencing, duty cycle and treatment duration.

Of particular interest, the system 200 further includes a communication unit 260 which is adapted to send and receive data from the cloud 265 or an alternative memory unit for storing and analyzing patient and user data. The communication unit 260 also is adapted to communicate with a touchscreen 270 or other means for monitoring, adjusting and controlling all operating parameters of the system 200.

As can be seen in FIG. 3, the system 200 also can include an optional negative pressure source 285 of the type described in the previous embodiment for providing negative pressure in the interior chamber 210. Such a negative pressure source 285 again can be controlled by the controller 250 and operate a pump 286 in the device. An actuation switch 288 is provided as described previously.

In one variation, the distal portion 290 of the device may be removable to provide a distal opening to the interior chamber 210 to allow for simplified cleaning thereof. In use, it may be advantageous to use fluids. gels, etc. to facilitate insertion and withdrawal of the penile shaft 228 as well as for coupling acoustic energy to tissue. In the event the distal portion 290 is removable, there may be electrical connections between that removable portion 290 and the remainder of the assembly 205. Such electrical connections can be male-female types of plug-in arrangements with suitable fluid sealing features.

Figure 4:
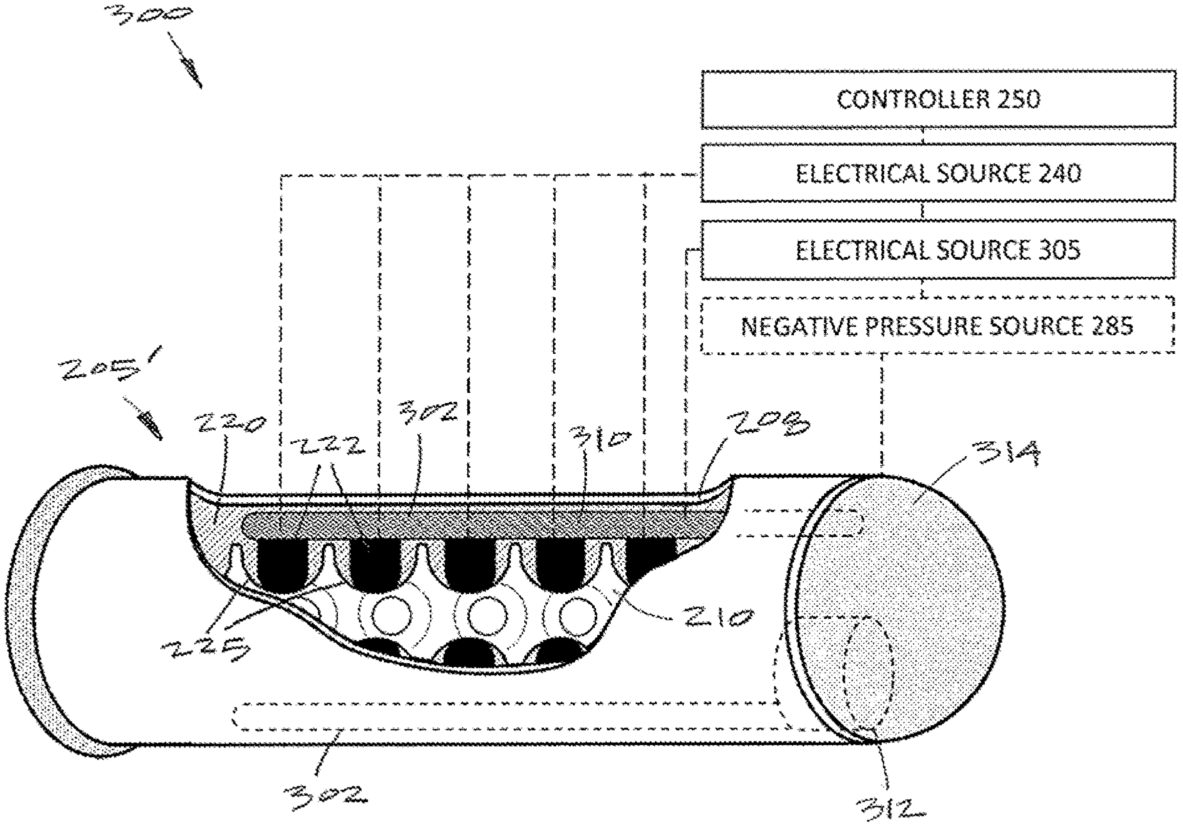
FIG. 4 is a variation of the acoustic treatment device of FIG. 3.

FIG. 4 illustrates another variation of an acoustic wave or shockwave treatment system 300 that is very similar to that of FIG. 4 with the addition of one additional functional feature to make the elastomeric structure 220 variably stiff or rigid. As can be seen in FIG. 4, the system 300 comprises an elongate assembly 205' again with a rigid outer wall 208 and defines an interior chamber 210 therein. The structure 220 surrounding the interior chamber 210 again comprises a soft elastomer layer with a plurality of acoustic emitters 222 disposed in elastomer projections 225.

In FIG. 4, the elastomer structure 220 includes an annular fluid-filled chamber 302 or a series of individual fluid-filled chambers disposed radially outward of the acoustic emitters 222. The chamber 302 is operatively coupled to an electrical source 305 that can deliver electrical current to the chamber 302, typically from at least first and second opposing polarity electrodes (not shown) exposed to the interior of the fluid-filled chamber 302. The chamber 302 is filled with a magnetorheological fluid (MR fluid) 310 which is known in the art as having differing viscosities when electrically charged or when not electrically charged. In this variation, the MR fluid 310 would be not electrically charged and freely flowable for insertion of a penile shaft into the interior chamber 210, and then the MR fluid 310 would be electrically charged to be substantially stiff or highly viscous at the time of deliver energy from the acoustic emitters 222. Thus, the elastomer structure 220 would not absorb any of the energy from actuation of the emitters 222 and would deliver more powerful shockwaves SW to tissue.

As can be said further seen in FIG. 4, the fluid-filled chamber 302 includes an expansion reservoir 312 in the distal portion 314 of the device where MR fluid could be displaced upon insertion of the penile shaft into the interior chamber 210 which displaces or compresses the projections 225 when the MR fluid 310 is freely flowing and not charged. In other variations, the distal portion 314 of the device could be squeezable to cause the fluid inflow proximally into the chamber 302 to compress the penile shaft with the projections 225 and acoustic emitters 222 or a pump mechanism could be provided to cause the MR fluid 310 to flow proximally into chamber 302. The electrical source 305 can be powered by a battery and capacitors carried in the device or can be connected to a remote source as described previously.

In general, a tissue treatment method corresponding to the invention comprises (i) positioning a mammalian penile shaft in an interior chamber of an elongate tubular member, and (ii) delivering acoustic energy to said shaft in a plurality of locations which can increase tissue plasticity and blood flow. The treatment may be provided in a negative pressure environment which further increases blood flow to the penile shaft of the patient during treatment.

Figure 5:
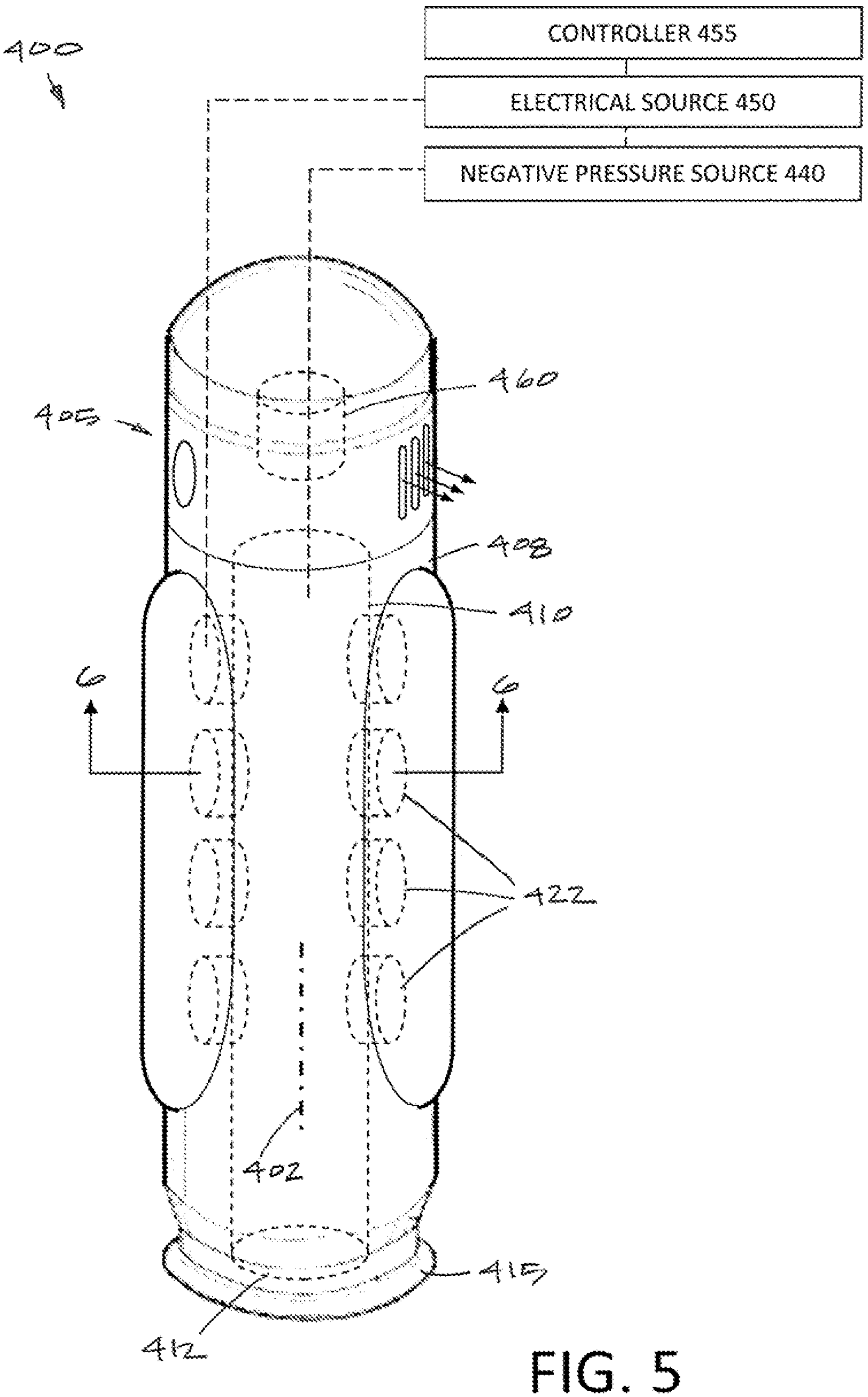
FIG. 5 is another variation of acoustic treatment device similar to that of FIG. 1.
Figure 6:
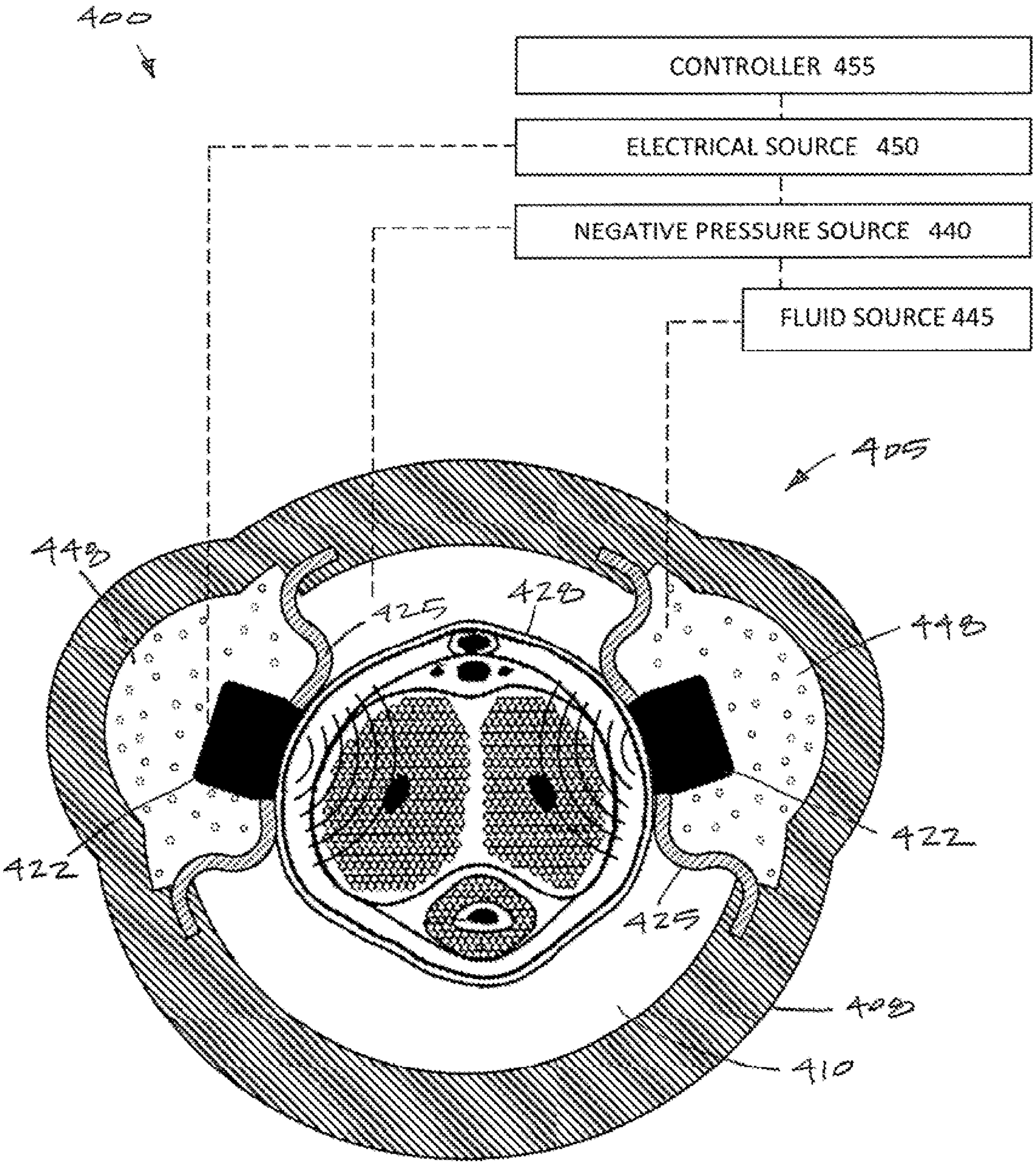
FIG. 6 is a sectional view of the acoustic treatment of FIG. 5 taken along line 6-6 of FIG. 5.

FIGS. 5 and 6 illustrate another alternative acoustic wave or shockwave treatment system 400 that differs from the previous embodiments. As can be seen in FIG. 5, the system includes an elongate assembly 405 extending about longitudinal axis 402 wherein the assembly has a substantially rigid outer wall 408 with an interior chamber 410 therein. The interior chamber 410 has an opening 412 that is again dimensioned to receive and accommodate a mammalian penile shaft. A foam cuff 415 is disposed around the opening 412 of the interior chamber 410.

Referring to FIG. 6, it can be seen that a plurality of acoustic emitters 422 are carried in elastomeric walls 425 that the stretchable to engage a penile shaft 428. The negative pressure source 440 communicates with the interior chamber 410 and can thereby suction the emitters 422 against the shaft 428. Optionally, the fluid source 445 can be provided to expand chambers 448 to cause the acoustic emitters 422 to contact the penile shaft 428. An electrical source 450 and controller 455 are provided to operate the acoustic emitters 422 as described previously. A pump 460 is provided to evacuate air from the interior chamber 410 as described previously.

Figure 7:
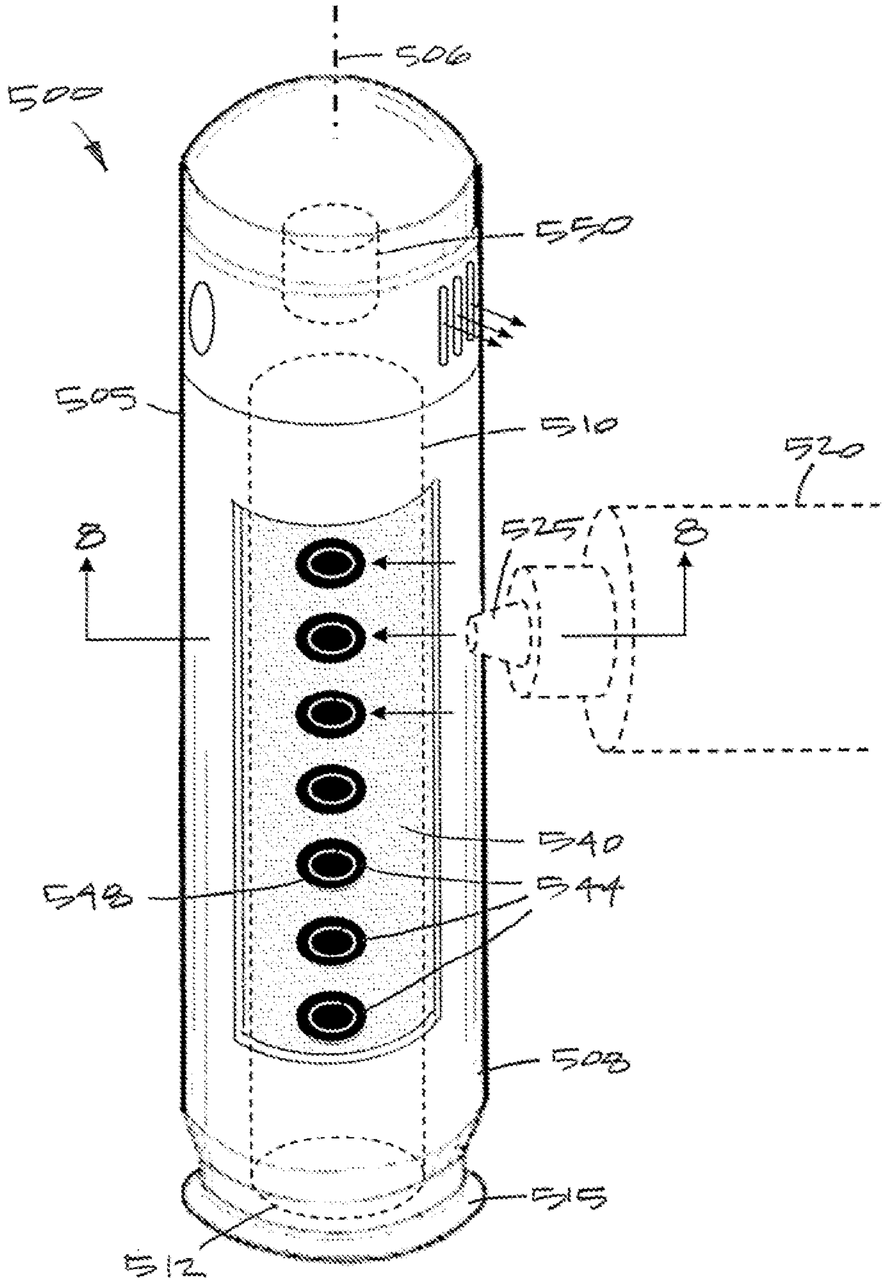
FIG. 7 is a perspective view of an alternative system adapted for treatment of a mammalian penile shaft, wherein the acoustic transmitter is independent of the tissue-engaging portion of the system.
Figure 8:
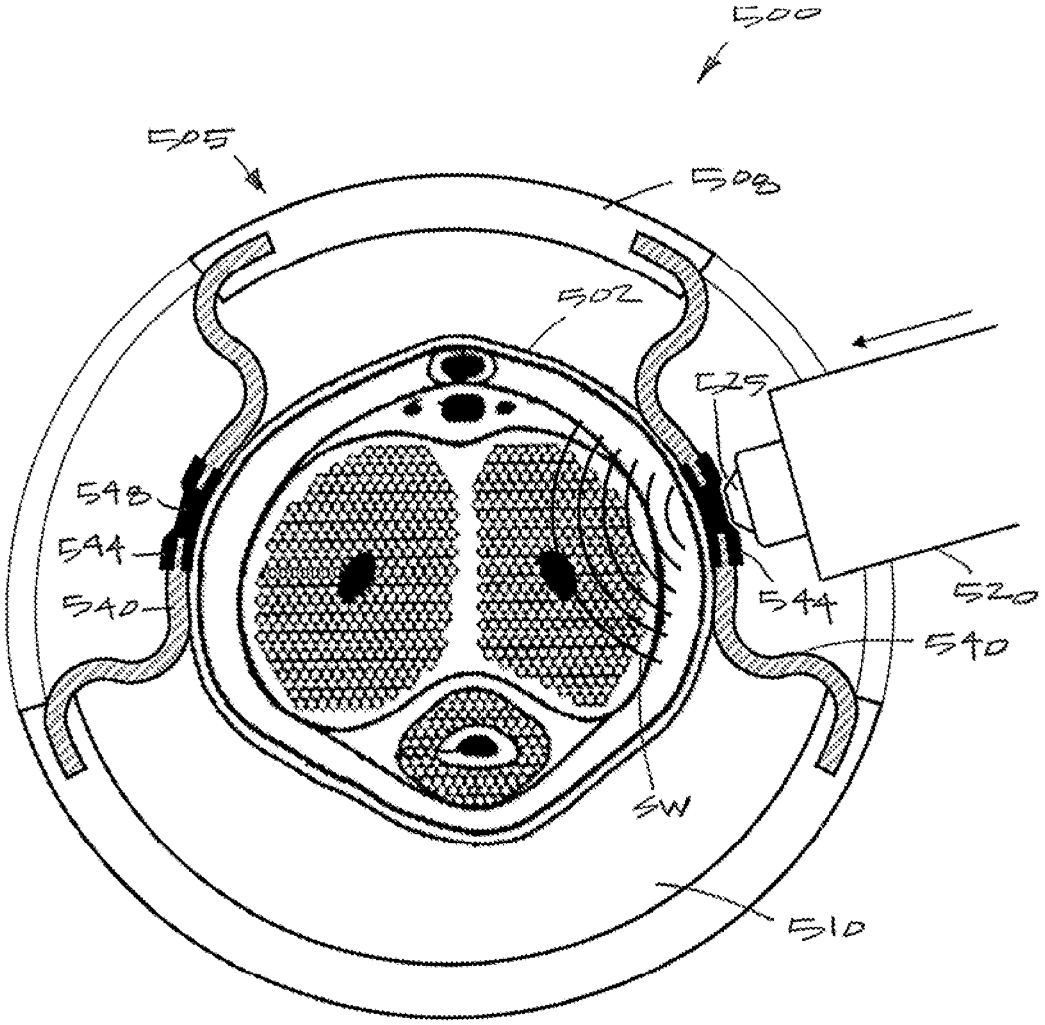
FIG. 8 is a cross-sectional diagrammatical view of the system of FIG. 7 illustrating a method of the invention in the delivery of acoustic energy to a penile shaft with the system of FIG. 7 taken along line 8-8 of FIG. 7.

FIGS. 7 and 8 illustrate another acoustic wave or shockwave treatment system 500 that is adapted to use a single acoustic emitter that is separate from the device that engages the penile shaft 502. As can be seen in FIG. 7, the system includes an elongate assembly 505 extending about longitudinal axis 506 where the assembly has a rigid outer wall 508 with an interior chamber 510. The interior chamber 510 has an opening 512 that is again dimensioned to receive and accommodate a mammalian penile shaft. A flexible cuff 515 is disposed around the opening 512 of the interior chamber 410.

Referring to FIG. 7, it can be seen that a hand-held acoustic device 520 is provided, which for example, can be a shockwave GentlePro or other similar device available from Zimmer Aesthetics, Junkersstraße 9, Neu-Ulm, Germany 89231. In FIG. 7, the acoustic device 520 has an acoustic tip 525 that is configured for contact with tissue to transmit shockwaves SW to such tissue (see FIG. 8).

In FIGS. 7 and 8, it can be seen that portions of the wall 508 comprise thin elastomeric portions 540 that are stretchable to engage a penile shaft 502 (FIG. 8). The elastomeric portions 540 carry metal or plastic contact elements 544 which are adapted to optimally transmit acoustic energy from the acoustic tip 525 to the engaged penile shaft 502. The contact elements 544 comprise a base material and are adapted to transmit acoustic waves better than if such energy was transmitted through an elastomeric layer in contact with targeted tissue which would absorb some energy. As can be seen in FIG. 8, each contact element 544 may be configured with a recess 548 or other feature to cooperate with the shape of the acoustic tip 525 to ensure that the acoustic tip 525 is localized in the contact element 544 so that acoustic waves are transmitted through the contact element 544.

FIG. 7 illustrates that a pump 550 comprises a negative pressure source as described previously which communicates with interior chamber 510 and can thereby suction the elastomeric portions 540 and contact elements 544 against the penile shaft 502.

Figure 9:
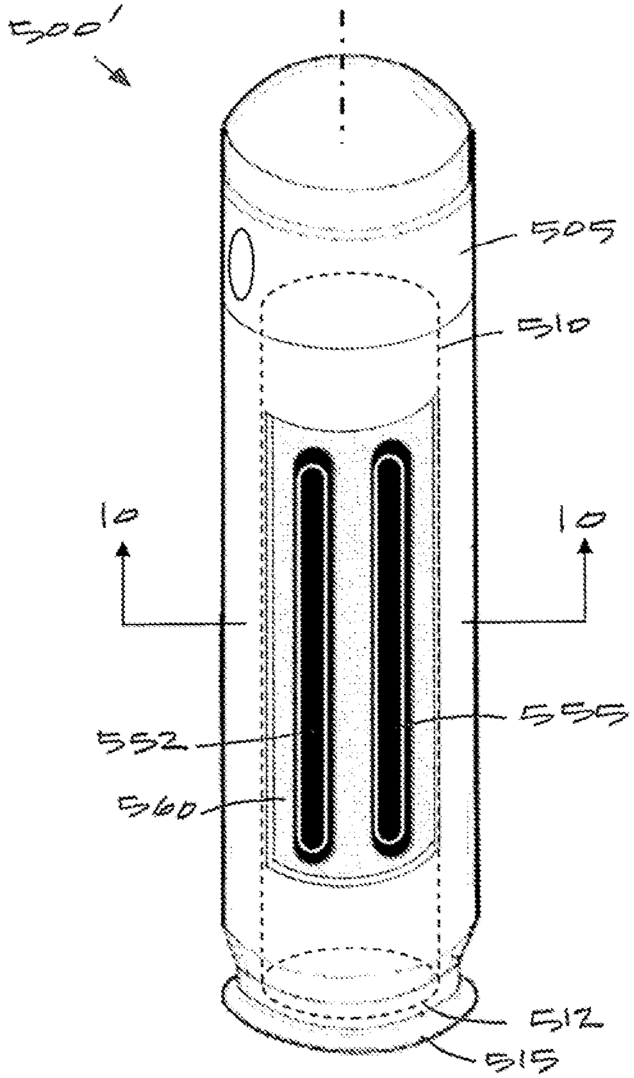
FIG. 9 is a perspective view of an alternative system similar to that of FIG. 7.
Figure 10:
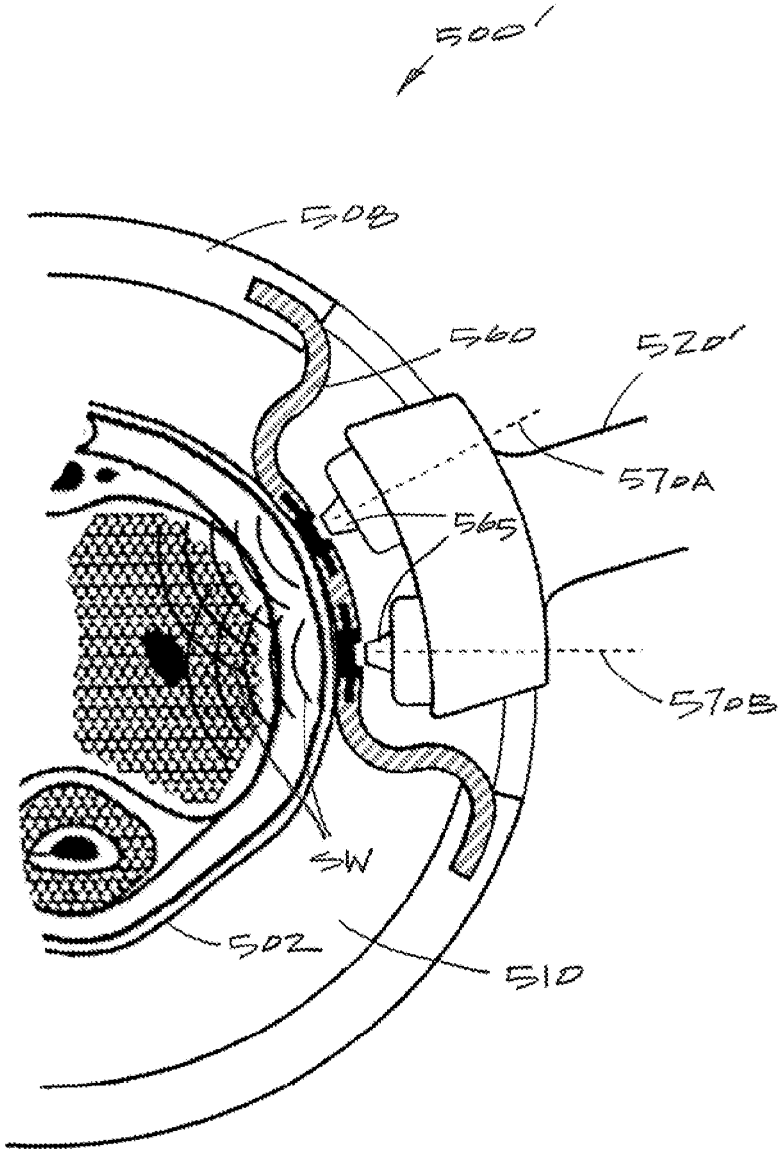
FIG. 10 is a cross-sectional view of the system of FIG. 9 showing a method of delivering acoustic energy about a first and second transmission axes taken along line 10-10 of FIG. 9.

FIGS. 9 and 10 illustrate another acoustic wave or shockwave treatment system 500' that is similar to the system of FIGS. 7 and 8 except that the acoustic emitter device 520' carries first and second emitters 565 which can simultaneously deliver shockwaves SW along converging axes 570A and 570B (see FIG. 10).

As can be seen in FIG. 9, the system includes the elongate assembly 505 similar to that of FIG. 7 which includes a rigid outer wall around interior chamber 510. The cylindrical interior chamber 510 has an opening 512 that is again dimensioned to receive and accommodate a mammalian penile shaft. A flexible cuff 515 again can be is disposed around the opening 512 of the interior chamber 510.

While the invention has been described with the acoustic emitters generally in a fixed location on the elongate member, should be appreciated that the robotic form of the system can be provided wherein one or more acoustic emitters are moved axially or rotationally within stationary outer sleeve to treat tissue. In such a variation, the robotic version of the control by the controller that controls all operating parameters of the acoustic emitter as well as translational movement of the emitters. While the acoustic energy emitters described above are described as electromagnetic devices, it should be appreciated that other mechanisms are possible for using shockwave such as a compressed air mechanisms and cavitation devices which fall within the scope of the invention.

In other variations, should be appreciated that light energy mechanisms, electrical stimulus mechanisms, vibration mechanisms, cooling elements such as Peltiers, and heating elements can be provided in the interior chamber of the treatment device to enhance treatment.

Although particular embodiments of the present invention have been described above in detail, it will be understood that this description is merely for purposes of illustration and the above description of the invention is not exhaustive. Specific features of the invention are shown in some drawings and not in others, and this is for convenience only and any feature may be combined with another in accordance with the invention. A number of variations and alternatives will be apparent to one having ordinary skills in the art. Such alternatives and variations are intended to be included within the scope of the claims. Particular features that are presented in dependent claims can be combined and fall within the scope of the invention. The invention also encompasses embodiments as if dependent claims were alternatively written in a multiple dependent claim format with reference to other independent claims.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A tissue treatment device comprising:

an elongate tubular assembly extending along an axis a proximal opening adjacent to an interior chamber adapted for receiving a shaft of a mammalian penis;

a plurality of acoustic energy emitters comprising at least a first acoustic energy emitter and a second acoustic energy emitter, the plurality of acoustic energy emitters configured to produce an acoustic energy at a high intensity sufficient to produce shock waves, where the first acoustic energy emitter and the second acoustic energy emitter are positioned on opposing sides of the interior chamber to deliver the acoustic energy to opposing sides of the shaft when placed within the interior chamber; and a wall adjacent to the interior chamber, the wall comprising an elastomeric portion having at least one contact element, where the at least one contact element is configured to transmit acoustic energy to a greater degree than the elastomeric portion, where the at least one contact element is adjacent to at least one of the plurality of acoustic energy emitters.

2. The tissue treatment device of claim 1, further comprising an elastomeric structure within the elongate tubular assembly and surrounding the interior chamber, where at least one of the plurality of acoustic energy emitters is positioned in the elastomeric structure.

3. The tissue treatment device of claim 1, wherein the interior chamber includes at least one wall portion configured to be adjusted between a first cross-sectional shape that does not engage the shaft a second cross-sectional shape that engages the shaft.

4. The tissue treatment device of claim 3, where the at least one wall portion further includes at least one contact portion configured to engage the shaft.

5. The tissue treatment device of claim 4, wherein the at least one contact portion is configured to transmit the acoustic energy to the shaft.

6. The tissue treatment device of claim 5, wherein the at least one contact portion includes a surface portion that can be elongated.

7. The tissue treatment device of claim 6, wherein the at least one contact portion includes an elastomeric surface portion.

8. The tissue treatment device of claim 6, wherein the at least one contact portion includes a thin section of material that transfers acoustic energy.

9. The tissue treatment device of claim 6, where at least one of the plurality of acoustic energy emitters is adapted to transmit the acoustic energy through the at least one contact portion.

10. The tissue treatment device of claim 3, further comprising a negative pressure source coupled to the interior chamber adapted for adjusting the elongate tubular assembly between the first cross-sectional shape and the second cross-sectional shape.

11. The tissue treatment device of claim 1, wherein each of the plurality of acoustic energy emitters comprises an electromagnetic device.

12. The tissue treatment device of claim 11, further comprising a controller configured for modulating parameters of acoustic energy delivery.

13. The tissue treatment device of claim 12, wherein the parameters are selected from the group of amplitude, frequency, duty cycle and sequencing among the plurality of acoustic energy emitters.

14. The tissue treatment device of claim 1, further comprising a negative pressure source coupled to the interior chamber.

15. The tissue treatment device of claim 1, wherein at least one of the plurality of acoustic energy emitters comprises a device selected from the group consisting of an electromagnetic device, a compressed air device and a cavitation device.

16. The tissue treatment device of claim 1, further comprising a controller configured for modulating parameters of acoustic energy delivery.

17. The tissue treatment device of claim 16, wherein the parameters are selected from the group of amplitude and frequency.

18. A tissue treatment device comprising:

an elongate tubular assembly extending along an axis a proximal opening adjacent to an interior chamber adapted for receiving a shaft of a mammalian penis;

a plurality of acoustic energy emitters comprising at least a first acoustic energy emitter and a second acoustic energy emitter, the plurality of acoustic energy emitters configured to produce an acoustic energy at a high intensity sufficient to produce shock waves, where the first acoustic energy emitter and the second acoustic energy emitter are positioned on opposing sides of the interior chamber to deliver the acoustic energy to opposing sides of the shaft when placed within the interior chamber; and a wall surrounding an interior chamber, the wall comprising a first wall portion and a second wall portion, wherein the first wall portion includes a non-deflectable material and the second wall portion includes a deflectable material, where the second wall portion also includes at least one non-elastomeric section adapted for transmission of acoustic energy therethrough.

19. A tissue treatment device comprising:

an elongate tubular assembly extending along an axis a proximal opening adjacent to an interior chamber adapted for receiving a shaft of a mammalian penis;

a plurality of acoustic energy emitters comprising at least a first acoustic energy emitter and a second acoustic energy emitter, the plurality of acoustic energy emitters configured to produce an acoustic energy, where the first acoustic energy emitter and the second acoustic energy emitter are positioned adjacent to sides of the interior chamber to deliver the acoustic energy to sides of the shaft when placed within the interior chamber;

an elastomeric structure within the elongate tubular assembly and surrounding the interior chamber, where at least one of the plurality of acoustic energy emitters is positioned in the elastomeric structure; and a fluid-filled chamber positioned radially outward from the at least one of the plurality of acoustic energy emitters such that inflation of the fluid-filled chamber causes the at least one of the plurality of acoustic energy emitters to contact the mammalian penis.

20. The tissue treatment device of claim 19, wherein the fluid-filled chamber contains a magnetorheologic fluid.

21. A tissue treatment device comprising:

an elongate tubular assembly extending along an axis a proximal opening adjacent to an interior chamber adapted for receiving a shaft of a mammalian penis;

a plurality of acoustic energy emitters comprising at least a first acoustic energy emitter and a second acoustic energy emitter, the plurality of acoustic energy emitters configured to produce an acoustic energy at a high intensity sufficient to produce shock waves, where the first acoustic energy emitter and the second acoustic energy emitter are positioned on opposing sides of the interior chamber to deliver the acoustic energy to opposing sides of the shaft when placed within the interior chamber; and an elastomeric structure within the elongate tubular assembly and surrounding the interior chamber, where at least one of the plurality of acoustic energy emitters is positioned in the elastomeric structure; and a fluid-filled chamber positioned radially outward from the at least one of the plurality of acoustic energy emitters such that inflation of the fluid-filled chamber causes the at least one of the plurality of acoustic energy emitters to contact the mammalian penis.

22. The tissue treatment device of claim 21, wherein the fluid-filled chamber contains a magnetorheologic fluid.

* * * * *